United States Patent
Novotny et al.

(10) Patent No.: US 10,313,565 B2
(45) Date of Patent: Jun. 4, 2019

(54) METHODS AND APPARATUSES FOR EDGE PRESERVING AND/OR EDGE ENHANCING SPATIAL FILTER

(71) Applicant: Integrated Device Technology, Inc., San Jose, CA (US)

(72) Inventors: Pavel Novotny, Waterloo (CA); Eric Pearson, Contestogo (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/316,329

(22) Filed: Jun. 26, 2014

(65) Prior Publication Data

US 2015/0379693 A1    Dec. 31, 2015

(51) Int. Cl.
*H04N 1/409* (2006.01)
*H04N 5/14* (2006.01)
*H04N 21/2187* (2011.01)

(52) U.S. Cl.
CPC .................................. *H04N 5/142* (2013.01)

(58) Field of Classification Search
CPC .............................. H04N 5/142; G06T 5/001
USPC .......................................... 348/184; 382/261
See application file for complete search history.

(56) References Cited

U.S. PATENT DOCUMENTS

| | | | |
|---|---|---|---|
| 5,050,227 A * | 9/1991 | Furusawa | G06T 5/20 358/448 |
| 5,844,627 A | 12/1998 | May et al. | |
| 6,657,676 B1 | 12/2003 | Borneo et al. | |
| 7,046,307 B1 | 5/2006 | Hui | |
| 2007/0242288 A1 | 10/2007 | Fan | |
| 2008/0085060 A1 | 4/2008 | Bosco et al. | |
| 2009/0041373 A1 | 2/2009 | Incesu et al. | |
| 2009/0153739 A1 | 6/2009 | Hong | |
| 2010/0027905 A1* | 2/2010 | Zhang | G06T 5/002 382/261 |
| 2010/0220939 A1 | 9/2010 | Tourapis et al. | |
| 2012/0030219 A1 | 2/2012 | Xu et al. | |

(Continued)

OTHER PUBLICATIONS

International Search Report and Written Opinion for International Application No. PCT/US2015/033805dated Sep. 11, 2015.

*Primary Examiner* — Jefferey F Harold
*Assistant Examiner* — Sihar A Karwan
(74) *Attorney, Agent, or Firm* — Christopher P. Maiorana, PC

(57) ABSTRACT

A technique to perform edge-aware spatial noise filtering that may filter random noise from frames while maintaining the edges in the frames. The technique may include receiving a frame comprising a pint ht of pixels, filtering a subset of the plurality of pixels based on a weighting factor associated with each pixel of the subset of pixels, wherein the weighting factor is at least in part based on a difference in pixel value between the pixel and the individual pixels in the subset, and providing the filtered pixel to an encoder for encoding. Example implementation may include a spatial noise filter to receive an image, the noise level, and configuration parameters, and configured to determine weighting factors of pixels of the image based on differences in pixel values and a set of configuration parameters, and further configured to filter noise from the image based on the weighting factors of the pixels.

18 Claims, 9 Drawing Sheets

(56) References Cited

U.S. PATENT DOCUMENTS

| | | | |
|---|---|---|---|
| 2012/0188373 A1* | 7/2012 | Kwon | H04N 1/409 348/148 |
| 2013/0135525 A1* | 5/2013 | Netterdag | H04N 21/2187 348/468 |
| 2016/0088316 A1 | 3/2016 | Novotny | |

* cited by examiner

METHODS AND APPARATUSES FOR EDGE PRESERVING AND/OR EDGE ENHANCING SPATIAL FILTER

TECHNICAL FIELD

Embodiments of the present invention relate generally to video processing and examples of spatial filtering for preserving edges or enhancing edges within a frame are described. Examples include methods of and apparatuses for edge preserving and/or edge enhancing spatial filters.

BACKGROUND

Broadcasting images, whether they are videos or still images, conventionally requires some level of encoding. The quality of the encoded images, perhaps to a viewer receiving, the broadcast images and viewing them on a monitor, may be affected by any noise filtering the images receive before or during the encoding process. The noise filtering may be performed spatially, temporally, or a combination of the two, and may result in images having white noise filtered from their data. Conventional filtering, however, may reduce image quality in certain aspects if the filtering results in blurring the images, particularly at the boundaries between high contrast regions within the image. In certain situations, this may not be an issue if the producer of the image desires a soft appearance. However, in other instances when the image is desired to be of high quality and high definition, the blurring of the image may be undesirable. Yet, for high quality, high definition images the noise may still require filtering to obtain such quality objectives.

DETAILED DESCRIPTION

Various example embodiments described herein include methods and apparatuses to perform edge-aware spatial noise filtering of frames. The edge-aware spatial noise filtering processes described herein may filter random noise (e.g. white noise) from frames while maintaining the edges in the frames. By taking, contrast changes at the edges in frames into account, the edge-aware noise filtering may filter out the random noise without blurring, or with reduced blurring of, the edges or fine details contained within the frames. The same filtering may also or instead be used to enhance edges in frames, if so desired. The edge-aware spatial filtering may be performed on complete frames or subsets of the frames and the filtered frames may be used in encoding processes of a broadcasting system.

The edge-aware spatial filtering may be performed at the pixel level of a frame (e.g., an image), which may be contained in a video such that a video may include one or more frames. Further, each frame may be broken down into various sizes, macroblocks for example. For example, all of the pixels of a frame ma be filtered, before a subsequent frame is filtered. The filtering operations may be performed across the entire frame or on macroblocks of the frame. Further, each frame may be included in a video, where a video may include one or more frames. Additionally, a frame may constitute a single still image, which may also be filtered by the filtering technique described herein.

As noted above, the transmission of frames may involve encoding the frames before being broadcast. The encoding, for example, may convert baseband video, where the baseband video may include one or more frames for example, into a compressed bitstream suitable for transmission such as by a broadcast system. The encoded and broadcast frames may have been captured by video equipment (e.g., digital video recorders, film-based cameras, still cameras, and etc.). The captured frames may include random noise (e.g. white noise) due, for example, to the frame capturing equipment or various other reasons.

Figure 1:
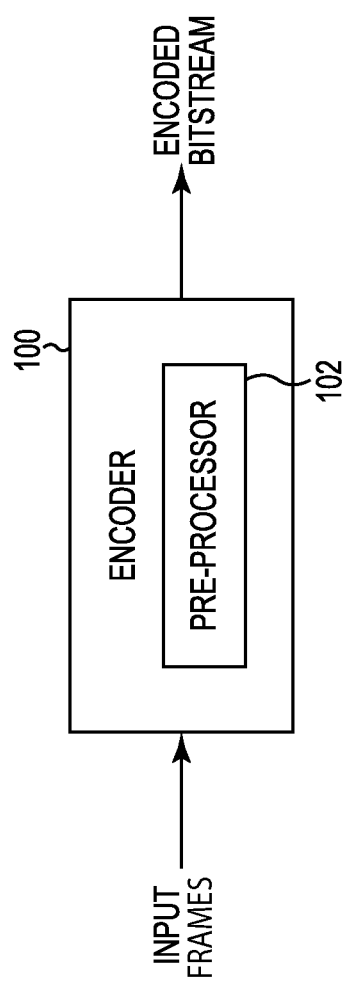
FIG. 1 is a block diagram of a video encoder according to the present disclosure.

FIG. 1 is a block diagram of an encoder 100 implementing edge-aware noise filtering to enhance frame quality in a video while preserving and/or enhancing edges in the frame. The edge-aware filtering may be performed by the encoder 100 in conjunction with or prior to encoding. A pre-processor 102 may be included with the encoder 100 and may assist with the edge-aware noise filtering. In some examples, the pre-processor 102 may instead be separate from the encoder 100. In some examples, components of the pre-processor 102 may be included with the encoder 100 while other components may be separate from the encoder 100. The pre-processor 102 may be able to perform both temporal and spatial filtering for noise removal along with various other operations, such as noise level detection. In certain instances (e.g., discontinuous changes in the frames such as a scene change in a movie), however, temporal filtering, may not be available because multiple collated frames may not be available. In such instances spatial filtering may be used to remove the noise from the frames of the video. The spatial noise filtering may be used within a frame or macroblock of a frame to filter out noise from the input frames. Conventional spatial noise filtering, however, may have deleterious effects on fine detail and edges within the frame due to the averaging of the adjacent pixels that cross an edge, for example. An edge in this context may be a change in brightness, color, and/or contrast that may create a sharp change within the frame. For example, an edge would be created between a dark shadow and a sun-lit wall—the boundary line between the two regions being the edge. Conventional spatial noise filtering may blur such edges and fine details, which may be unfavorable.

To filter a frame, spatial noise filtering may average across a number of adjacent/consecutive pixels of the frame including the target pixel to generate a filtered pixel value. The averaging, however, may smooth out or blur an edge of a frame if the pixels being averaged cross the edge (e.g., includes pixels that are located on both sides of the edge). In some mediums (e.g., high art analog movies) this may not matter, or may even be desired, but other mediums (e.g., high definition television) may want to preserve the quality of the edge and possibly enhance the quality or strength of the edge. A technique to filter out noise while preserving, and potentially enhancing, the edges contained in video is therefore desired. Such an edge-aware noise filtering technique may be applied to both video and still images and may also be used in conjunction with any underlying encoding method performed.

One technique to alleviate or eliminate the blurring of edges and fine details may be to account for boundaries when spatially filtering noise from a frame (e.g., a still image or a frame of video). Such edge-aware spatial noise filtering may be performed on the frames while reducing or eliminating filtering across edges. Accordingly, frames may be filtered up to the edge, on both sides of the edge, but the large discontinuity at the edge may be reduced or eliminated from the filtering in order to reduce and/or eliminate blurring of those edges. Such a technique may still remove noise from frames without blurring edges and fine detail. Thus, those fine features and edges may be preserved by the noise filtering technique all while filtering out random noise from the frames. Additionally or alternatively, the same technique may be used to enhance the edges, e.g., make the edges more pronounced, without enhancing any noise, or with minimal noise enhancement, in the frames. Even further, edge preservation and edge enhancement filtering may be successively performed on frames to provide frames displaying both preservation and enhancement effects.

Either or both of the edge-aware spatial filtering techniques, the edge-preservation mode and the edge-enhancement mode, may be applied to frames, frames of baseband video for example, in various manners. For example, an entire frame of an image may be simultaneously filtered or individual macroblocks of the image may be filtered in succession until the entire image has been filtered. Either method may be implemented without deviating from the scope of the present disclosure.

The spatial noise filtering may be performed at the pixel level of the input frames using the individual pixel values. The pixel values may be in Red Green Blue (RGB) or luminance/chrominance format. In the RGB format, the spatial noise filtering may be applied separately to each color plane. In the luma/chroma format, the spatial noise filtering may also be separately applied to each plane forming the frame.

Figure 2:
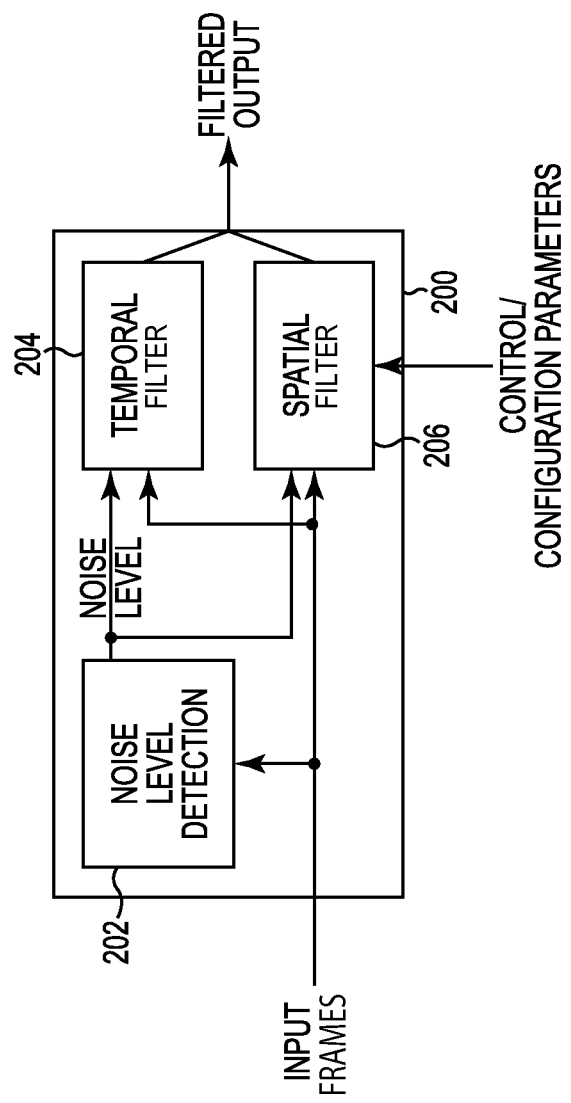
FIG. 2 is a block diagram of a video encoder pre-processor according to the present disclosure.

FIG. 2 is a block diagram of a pre-processor 200 in accordance with the disclosure which may implement edge-aware spatial noise filtering. The pre-processor 200 may be combined with an encoder, such as the encoder 100 of FIG. 1, or the pre-processor 200 may be a separate component in an encoding system. In either arrangement, the pre-processor 200 may receive input frames (e.g., still images and/or video) and provide spatially and/or temporally filtered data to an encoder. The output frames provided by the pre-processor 200 may have been filtered using an edge-aware spatial noise filter in accordance with this disclosure. For example, the output frames may have been filtered so that edges (e.g., boundaries between high contrast regions of an image) and fine details are preserved (e.g., not blurred or smoothed or experience reduced blurring or smoothing). Additionally or alternatively, the pre-processor 200 may operate in an edge enhancement mode, which may enhance the edges and fine details in the input images while filtering out random noise from the image.

Input images may be received by a noise level detection unit 202. The noise level detection unit 202 may be configured to analyze the input frames to determine a number of characteristics. Those characteristics may include an average noise level of the input frames. The noise level detection unit 202 may provide the threshold noise level to a temporal filter 204 and a spatial filter 206. The temporal and spatial filters may be used to filter random noise from the input frames. The noise level detection unit 202 may be of a conventional design understood by those skilled in the art.

The temporal filter 204 may be included in the pre-processor 200 and may be configured to filter noise from frames by sequentially comparing a number of frames from various time slices of the input. The temporal filter 204 may be motion compensated and of a conventional design those skilled in the art would understand. However, as noted above, when there is an abrupt change in the input, a scene change for example, that results in a lack of a sequence of collated input frames, the temporal filter 204 may not effectively filter the noise. In those situations, the spatial filter 206 may filter noise from the input frames using an edge-aware noise filter. FIG. 2 depicts the spatial filter 206 and the temporal filter 204 arranged to process the input in parallel but other arrangements may also be utilized, such as serially.

The spatial filter 206 may receive the input frames, the noise level and control/configuration parameter information. The control/configuration parameter information may indicate what mode the spatial filter 206 is to operate—edge enhancement mode or edge preservation mode—and the configuration parameters to implement in either or both modes. The control/configuration parameter information may be provided, for example, from a mode decision block in an encoder or another component or controller in an encoding system, and may further be pre-determined by a user of the encoder. The configuration parameter information may also establish filtering thresholds used in the edge-aware spatial noise filtering, which may be based on the determined noise level. Then, based on the control/configuration parameter information, the spatial filter 206 may perform adaptive edge-aware random noise filtering and provide filtered output images.

The spatial filter 206 may perform adaptive edge-aware noise filtering at the pixel level. Filters of various lengths may be implemented and the length of a filter is not a limiting factor for this disclosure. An adaptive, five-tap filter, for example, may be implemented by the spatial filter 206. The spatial filter 206 may be configured to filter across the pixels of a frame in one direction then again in the perpendicular direction, e.g., horizontally then vertically or vice versa. Any order of filtering, however, may be used. The spatial filter 206 may filter entire frame or it may filter macroblocks of an image, 8 by 8 blocks of pixels for example. The configuration parameters may be modified for every pixel, or a set of configuration parameters may be used for a block of pixels before the configuration parameters are adjusted. The size of the block given may indicate the size of the post filtered block, which may filter a larger block of pixels to generate a filtered block. As such, the number of input pixels may be dependent upon the size of the filter. For example, based on a five-tap filter, a filtered 8×8 block of pixels may need a 12×12 block of input pixels.

A block of pixels of the input frame may be filtered by the spatial filter 206 horizontally then vertically to provide a final filtered output. The number of input pixels chosen for either or both orientations may be based, at least in part, on the size of the filter utilized by the spatial filter 206. For example, a five-tap filter may generate eight filtered pixels from 12 input pixels with the center pixel of the filter being the target or filtered pixel. Thus, an input block with a size of 12 pixels (rows) by 12 pixels (columns) may be filtered both horizontally (along the rows) then vertically (along the columns) to provide an 8 pixel by 8 pixel output block of filtered pixels. The reduction in size is due to the filtering technique and may vary depending on the number of pixels used in the filter, e.g., the filter length. For example, if a five pixel filter is used with the 12×12 block, the outer two pixels may be used when filtering, the third and tenth pixel but may not generate a corresponding filtered output.

To further illustrate, a row of 12 pixels may be filtered using a filter length of five pixels. The center pixel in the filter length of five may be filtered to generate the corresponding filtered pixel by computing a weighted average of the five pixels in the filter, e.g., the center pixel plus the two pixels on each side of the center pixel. The center pixel of the filter has two adjacent pixels and two pixels separated by one pixel. As such, a five pixel filter may start with the third pixel in a row (or column) of 12 since that would be the first center pixel, e.g., the first pixel to have two pixels on both sides. Similarly, the tenth pixel in the row (or column) of 12 may be the last to be filtered for the same reason. However, for pixels that are at the edge of the image, e.g., at the edge of a frame and that do not have two pixels on at least one side, the non-existent pixels may be given a pixel value of zero to reduce or eliminate their impact on the filtering.

The spatial filter 206 may apply adaptive weighting factors to the adjacent pixels surrounding the center pixel of the filter length to account for edges that may fall within the length of the filter. The adaptive weighting factors may be based on an absolute difference in pixel value between the center pixel of the filter and the pixel associated with the weighting factor. This difference may inform the filter how similar in value the two pixels are. If the absolute difference is less than a first configurable threshold, the weighting factor may be set to a maximum and the pixel value may be used (without adjustment in some examples) by the filter as the filtered pixel value. The maximum weighting factor may be based on the video system and the number of bits used for each pixel. For example, if the system uses 8-bits to represent a pixel value, then the pixel value range may be from 0 to 256. If the absolute difference is greater than the first configurable threshold but less than a second configurable threshold, the weighting factor may be based on a linear interpolation of the absolute difference between the first and second configurable thresholds. The linear interpolation may go from the maximum value, e.g., 256, at the first threshold to a minimum value, e.g., zero, at the second threshold. The weighting factor may be zero for any absolute differences above the second threshold. Based on the foregoing description, if the filter crosses an edge, the absolute pixel differences that are dissimilar (e.g., greater than the second threshold) may receive a weighting factor of zero, which would effectively take those pixels out of the filtering calculation for that pixel. Conversely, if the absolute differences are less than the first threshold, then the pixel will receive a maximum weighting factor. For absolute differences between the first and second threshold, the weighting factor may linearly decrease from a maximum to a minimum based on the relative relation with the first and second thresholds.

To further illustrate, an example five-tap filter may use five consecutive pixels with the center pixel being the target/filtered pixel. The filtering operation may not be recursive, meaning the filtered pixels may be stored separately from the input pixels after the first filter pass (e.g., filtering horizontally). The other filtering orientation (e.g., filtering vertically) may then be applied to the output of the first orientation to produce the final filtered pixels. For ease of explanation, the five pixels used in the filter may be labeled A, B, C, D and E with C representing the center pixel. The pixel values may be represented by their corresponding label. An example adaptive edge-aware filter equation may be:

$$C_{filt}=(A*K_A+B*K_B+256*C+D*K_D+E*K_E)/(K_A+K_B+256+K_D+K_E). \quad (1)$$

Where the $K_X$ values represent the weighting factors of each pixel in the filter and the weighting factors may be separately generated. The value of 256, which may be a maximum weighting factor, may be based on the number of bits used to represent a pixel value and may change depending on pixel value representation. Any bit value may fall within the scope of the present disclosure. The 256 value used above, for example, may be associated with systems that use 8 bits to represent pixel values. The $K_X$ values may be generated by software, hardware, or a combination of software and hardware. For example, the $K_X$ values may be generated by an application specific integrated circuit (ASIC) or by a floating point gate array circuit. Alternatively, the $K_X$ values may be generated by a specialized processor executing software or firmware.

The calculation and generation of the various $K_X$ values for filtering a specific center pixel may use the configuration parameters and a pixel difference between the center pixel of the filter and the respective pixel associated with the $K_X$ value being generated. The difference between the pixel values, which may be labeled $delta_x$, may be an absolute difference between the two values. For example, $delta_A$ may be the absolute value of (C−A). The generation of each $K_X$ value may be labeled the GetK operation and may be performed in a various manners and may be based on the absolute difference between the pixel values. The GetK operation may also be different depending on what mode the spatial filter 206 is operating—enhancement or preservation.

The value of each $K_X$ may depend on the configuration parameters, such as MD, 2*MD, MD1, 2*MD1, ofs and ofs1, and the relation of the $delta_x$ to those configuration parameters. The configuration parameters may be based partly on the noise level calculated by the noise level detection unit 202 and may further be user defined in some examples. The MD and ofs parameters may be used while the spatial filter 206 is operating in the edge preservation mode whereas the MD1 and ofs1 parameters may be used while in the edge enhancement mode. The MD threshold may determine a boundary in the GetK function, which may indicate a maximum level of details which may be low passed by the spatial filter 206. As such, $delta_x$ values less than MD may cause a maximum value to be assigned to a corresponding $K_X$. $Delta_x$ values above 2*MD may be considered edges and may not be included in the calculation of a filtered pixel value, which may cause a corresponding $K_X$ to be assigned a minimum or zero value. A $delta_x$ filling in the region between MD and 2*MD may cause a $K_X$ to be assigned a value based on a linear interpolation between a value of [MD, 256] and [2*MD,0], for example, where [X,Y] represent coordinates on a plot that charts the deltax value on the x-axis and the pixel value (or absolute difference in the pixel values) along the y-axis. As such, the closer the $delta_x$ is to 2*MD, the lower the corresponding $K_X$ value. The ofs parameter, which may or may not be used by the edge-aware filter, may represent a strength of the filter. The strength of the filter may determine an amount of noise to be filtered out of the image. An ofs value of zero may set the strength of the filter to strongest setting while a value of 256 may cause the filter not to alter pixel values. After a $K_X$ value is determined based on the delta$_x$ to MD, 2*MD relationship, the ofs value may be subtracted from the $K_X$ value to obtain a final $K_X$ value to be used by the spatial filter 206.

The GetK function may differ based on the mode the spatial filter 206 is operating—edge enhancement or edge preservation. In the edge preservation mode, the GetK function may determine a weighting factor $K_X$ based on the delta$_x$, the MD and the 2*MD parameters. The GetK function may determine the weighting factor for a specific delta$_x$ by first determining where the delta$_x$ falls with regards to the first threshold value MD. If a delta$_x$ is less than MD, for example, then the GetK function may assign a maximum value to that $K_X$, 256 for example. For delta$_x$ values greater than 2*MD, the GetK function may assign a value of zero, which may indicate an edge falls between the two pixels. As such, this pixel value may not contribute to the calculation of the filtered pixel value. Lastly, if the delta$_x$ value falls between MD and 2*MD, then the weighting factor $K_X$ may be determined from a linear interpolation of delta$_x$ values between MD and 2*MD. This linear interpolation may allow for lower weighting factors to be assigned to pixels with varying differences between its value and the center pixel value. In scenarios where ofs is greater than zero, the $K_X$ values generated by the GetK function may be further reduced by an amount substantially equal to the ofs value. In this scenario, the final weighting factor will be the $K_X$ value reduced by the ofs value.

In the edge enhancement mode, the GetK function may operate differently and may determine $K_X$ values based on the delta$_x$, MD1, 2*MD1 and the ofs1 parameters. The GetK function may assign a maximum $K_X$ value to pixels with delta$_x$ values greater than 2*MD1 and assign a $K_X$ value of zero to pixels with delta$_x$ values below MD1. For delta$_x$ values that fall between MD1 and 2*MD1, the GetK may determine a corresponding $K_X$ value based on a linear interpolation between MD1 and 2*MD1. The MD1 value may represent a third threshold on determining on how much weight to assign a pixel for the filtering operation. An example implementation of the GetK function in the edge enhancement mode may be to assign $K_X$ value of zero to the outer two pixels, e.g, pixels A and E, and to assign $K_X$ values to pixels B and D as follows: $K_B=(K_B-256)*ofs1/256$. The same formula would be used for $K_D$ as well. In this implementation, the GetK function would first determine an initial $K_B$ based on the method discussed above and then the initial $K_B$ would be altered based on the formula. The ofs1 parameter may represent how much enhancement to perform on the pixels. When noise is present in the input images, MD1 may be raised above the noise level to prevent the noise from being enhanced.

Whereas the foregoing discussion included example embodiments implementing linear interpolation, the focus on the linear interpolation is not meant to limit the current disclosure. The linear interpolation is described for ease of description but any interpolation method may be used in other examples.

While in the edge preservation mode, the spatial filter 206 may filter random noise from pixels while preserving edges contained within a frame, e.g., edge-aware noise filtering without blurring or smoothing edges and fine details. The edge-aware noise filtering may be adaptive because it may filter across edges no matter where the edge falls within a length of the filter. The spatial noise filter 206, based on the weighting factors generated for each pixel, may omit or reduce a pixel from the filtering operation based on a difference in pixel values. This difference, along with configuration parameters, may allow the filter to determine whether to include a pixel in the filtering calculation and, if so, how much weight should be assigned to that pixel value. The final outcome may be pixel values having random noise filtered out all while preserving edges in the image. Conversely, in the edge enhancement mode, the spatial filter 206 may enhance the edges, e.g., enhance the contrast of the frames, to make the edges more pronounced. This may be performed with the same basic edge-aware noise filter but using different control and configuration parameters.

The spatial filter 206 may apply adaptive weighting factors to the adjacent pixels surrounding the center pixel of the filter length to account for edges that may fall within the length of the filter. The adaptive weighting factors may be based on an absolute difference in pixel value between the center pixel and the filter pixel associated with the weighting factor. This difference may inform the filter how similar in value the two pixels are. If the absolute difference is less than a configurable threshold, the weighting factor may be set to a maximum and the adjacent pixel value may be used by the filter. The maximum may be based on the video system and the number of bits used for each pixel. For example, if the system uses 8-bits to represent a pixel value, then the pixel value range may be from 0 to 256. If the absolute difference is greater than the threshold but less than a second threshold (e.g., two times the first threshold), the weighting factor may be based on a linear interpretation between the first and second thresholds. The linear interpretation may go from the maximum value, e.g., 256, to zero within a number of deltas, e.g., the absolute differences between the center pixel and the pixel associated with the weighting factor. The weighting factor may be zero for any absolute differences above the second threshold. As such, if the filter crosses an edge, the pixels that are dissimilar (e.g., greater than the second threshold) in value to the pixel being filtered may receive weighting factors of zero, which would effectively take them out of the filtering calculation. This would result in the noise being filtered out of the pixel based on averaging over equally weighted pixels but without the edge being smoothed due to the large differences between pixels on both sides of the edge.

Figure 3:
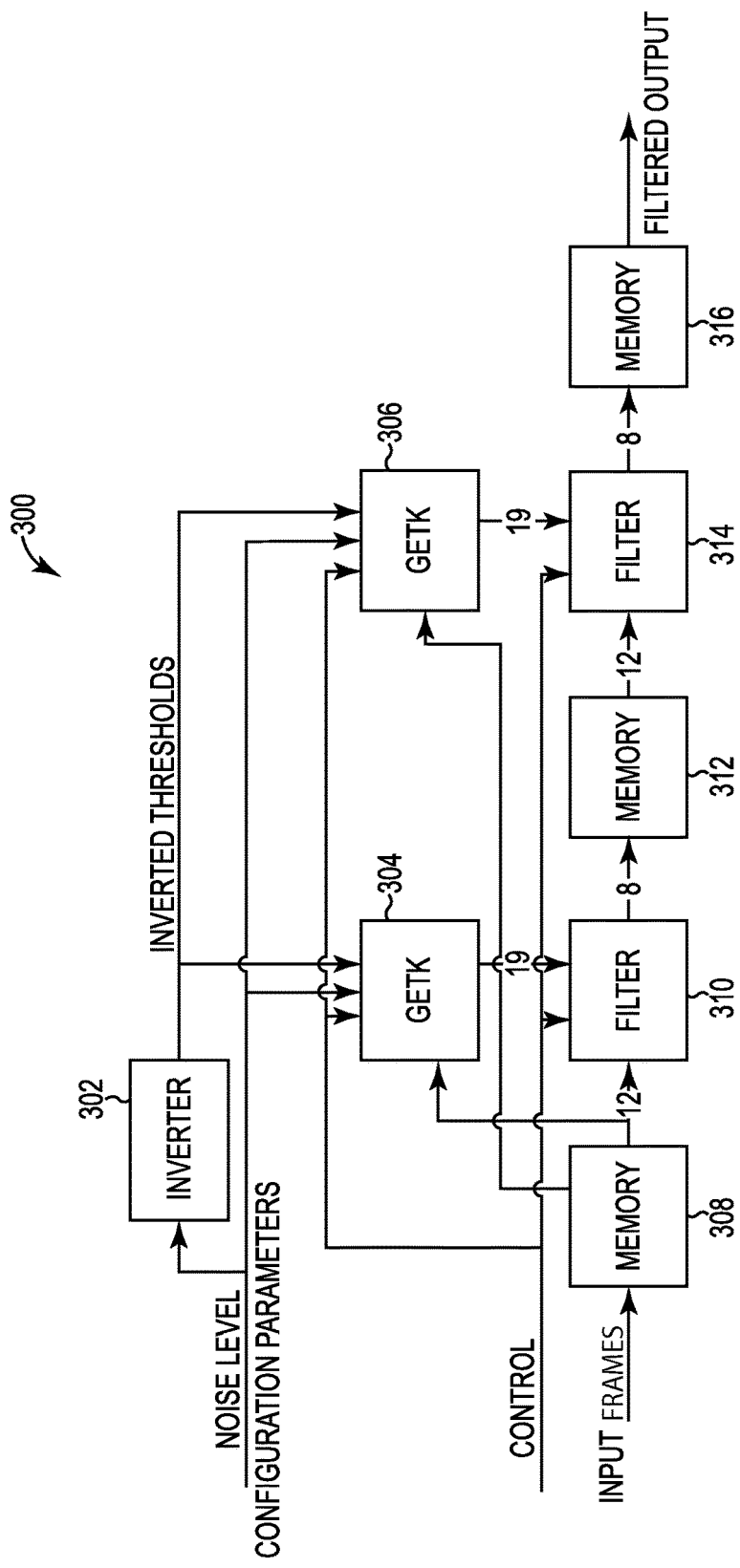
FIG. 3 is a block diagram of a spatial noise filter according to the present disclosure.

FIG. 3 is a block diagram of a spatial noise filter 300 according, to the present disclosure. The spatial filter 300 may be used for the spatial filter 206 of FIG. 2 and may be implemented in an encoder, such as the encoder 100 of FIG. 1. The spatial filter 300 may receive input frames (e.g., still images and/or video comprising of a plurality of frames), noise level parameters and the filter mode (enhancement or preservation) may be controlled by the control signal. Depending on the mode of the spatial filter 300, which may be controlled by a user, the input frames may either be filtered to remove random noise while preserving edges and fine details or the spatial filter 300 may enhance edges and fine details. The input frames may contain values for the individual pixels comprising the input. Two filtering blocks, two GetK blocks, and multiple memory blocks are depicted in FIG. 3 but other combination may also be implemented and would fall within the scope of the present disclosure. For example, the spatial noise filter 300 may be implemented with one memory one GetK block, and one filter block in some examples. The spatial noise filter 300 may be implemented in ASIC technology, floating point gate arrays, or by a processor executing software and/or firmware, or some combination thereof. For example, the memory 308 may be a FLASH memory, the GetK 304 may be an ASIC chip, and the filter 310 may be a second ASIC chip. However, the memory 308, the GetK 304 and the filter 310 may all be combined into a single ASIC chip, which may enhance overall performance.

The spatial filter 300 may receive the noise level parameters at an inverter 302 configured to pre-invert the parameters, such as MD and MD1. By pre-inverting the parameters, the complexity of the filtering calculation may decrease and the speed of the filtering may be improved. The pre-invert may extract a common divide from the interpolation process for the GetK calculations performed by the GetK 304, 306. The inverter 302 may divide $2^{16}$ by a configuration parameter to target a number of bits, e.g., eight, to use for the inverted configuration parameter. The $2^{16}$ divided by the configuration parameter may be extracted from the $K_X$ value during a later operation of a GetK operation, which may be implemented by either dividing by 256 or shifting a value right eight times. The inverter 302 may invert MD and MD1 in a time-multiplexed manner or it may invert only the parameter needed depending on the mode the spatial filter 300 is operating. The operational mode of the spatial filter 300 may be determined by the control signal received by the GetK 304, 306 and the Filter 310, 314.

The inverted configuration parameters may be provided by the inverter 302 to the GetK 304, 306. The GetK 304, 306 may also receive the mode control signal and un-inverted versions of the configuration parameters. The GetK 304, 306 may implement the GetK function as discussed above to determine the weighting factor for each pixel of a filter. The GetK 304 may be configured to generate the weighting factors for pixels being filtered horizontally direction while the GetK 306 may generate the weighting factors for pixels being filtered vertically. Both the GetK 304, 306 may generate $K_X$ values from the input pixels. The memories 308, 312, and 316 may be implemented as a single memory but three separate memories are shown for ease in understanding the filtering operations. The memories may be used to store the pixel values before, during and after filtering. The filters 310, 314 may be configured to receive the pixel values from the memories and the weighting factors from the GetK units and filter the pixels in accordance with Equation 1 above to provide filtered pixel values.

As noted above, the input frames are filtered at the pixel level and blocks of pixels may be filtered using the same configuration parameters. However, changing the weighting factors for each filter operation may additionally or instead be done in some examples. The input frames may first be received by the memory 308 and may be in blocks of pixels (e.g., 12×12 blocks) or an entire frame of pixels. The GetK 304 may access the pixels in the memory 308 to generate the weighting factors for each pixel, which would subsequently be used by the filter 310 to filter the pixels in the memory 308 and provide the filtered pixels to the memory 312. The filter 310 may be configured to filter the pixels either vertically or horizontally and the direction not filtered by the filter 310 would then be filtered by the filter 314.

The GetK 304 may be configured to generate the weighting factors in various manners. For example, the weighting factors for all pixels of a block or image could be generated at once and provided to the filter 310 as needed. Alternatively, the GetK 304 may generate the weighting factors as needed by the filter 310, which may be determined by the size of the block being filtered and the length of the filter. For example, if a filter length of five pixels is implemented by the filter 310, then the GetK 304 may generate the weighting factors for the five pixels used by the filter, provide those weighting factors to the filter, then generate the next set of five weighting factors.

Alternatively, if the spatial filter 300 is filtering 8×8 blocks of pixels using a five-tap filter, then a row (or column) of 12 pixels may be used to filter the 8 pixels. Based on this example implementation, the GetK 304, 306 may generate 19 different $K_X$ values for each row (or column). The 19 $K_X$ values for 12 input pixels are based on the filter length of five and that many of the $K_X$ values may be re-used. Since the $K_X$ values are generated for each center pixel of the filter based on two adjacent pixels and two pixels one place away, a number of the values will be re-used since the same GetK determination would be made twice, 13 of them may be reused in this implementation. Thus, based on this implementation, the GetK 304 may generate 19 $K_X$ values for a row of 12 pixels. Those 19 $K_X$ values may then be provided to the filter 310 to produce filtered pixel values for 8 pixels. The 8 filtered pixel values may then be provided to the memory 312. The 12 input values, for example, may be 12 horizontally adjacent pixels from an input image. The filter 310 may then produce 8 filtered pixels also oriented horizontally.

The GetK 306 may also generate 19 $K_X$ values for 12 input pixels from the memory 308, but the input, pixels may be from the perpendicular pixel orientation of the GetK 304 and the filter 310. For example, if the GetK 304 and the filter 310 filtered pixels horizontally, then GetK 306 and the filter 314 may filter pixels vertically. However, the same input pixels stored by the memory 308 may be used by the GetK 306 to generate the $K_X$ values for the columns of the input block of pixels. The GetK 306 may therefore in some examples not use the once filtered pixel data stored in the memory 312.

The filter 314 may then access the once-filtered pixels in the memory 312 to filter the once filtered pixels in the horizontal direction. Again, input blocks of 12×12 pixels may be used to generate filtered blocks of 8×8 pixels. The pixels filtered by the filter 314 may then be provided to the memory 316 to store the fully filtered pixels. These fully filtered images may then be provided to an encoder.

Figure 4:
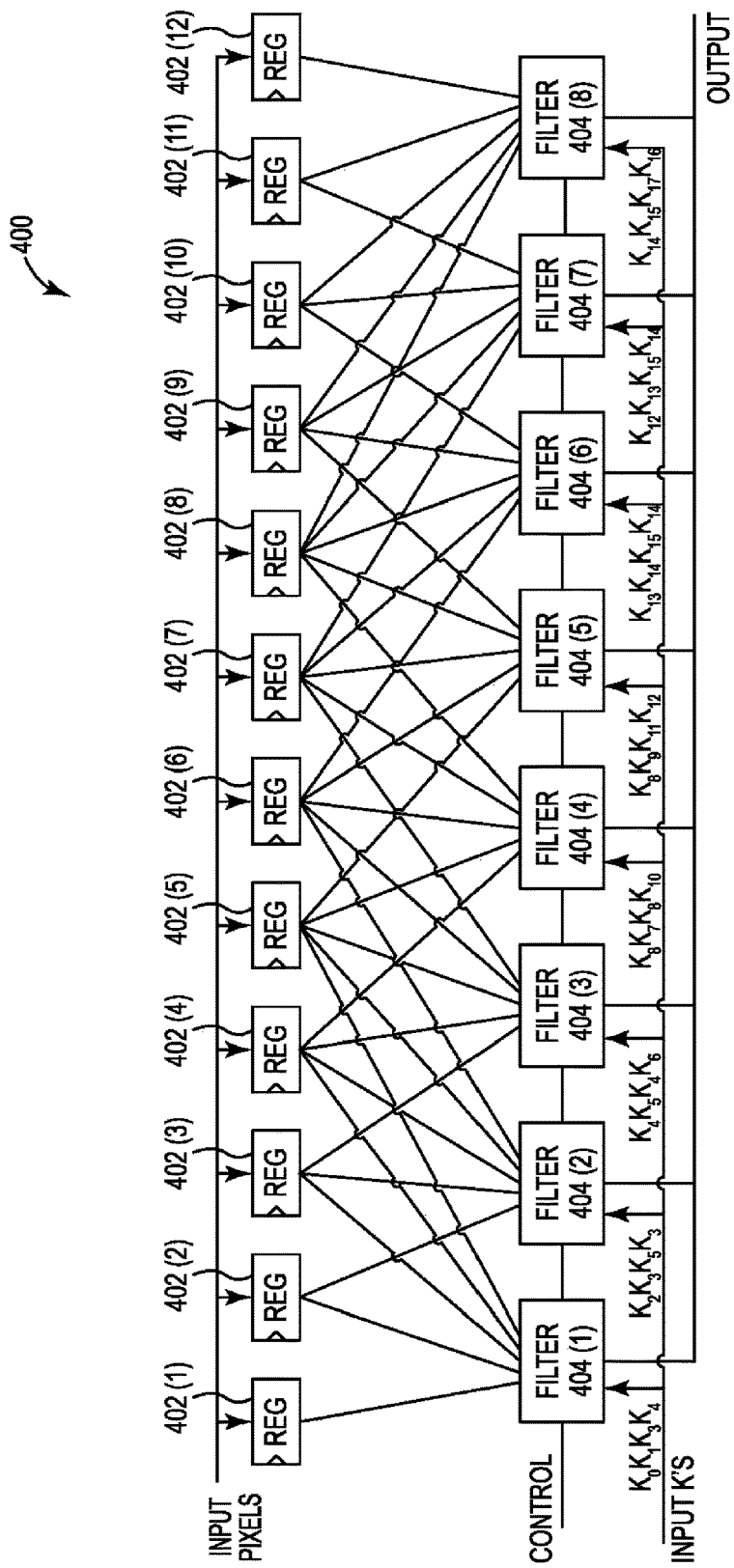
FIG. 4 is an illustrative example of a spatial noise filter according to the present disclosure.

Another example of a spatial filter implementing adaptive, edge-aware spatial noise filtering may be implemented by the illustrative example of a spatial noise filter 400 as shown in FIG. 4 and according to the present disclosure. The spatial noise filter 400 may be used for either the spatial filter 310 or 314 of FIG. 3. The spatial noise filter 400 may include 12 registers 402(1)-402(12) configured to receive 12 input pixels, which provide the input pixel values to one or more filters 404(1)-404(8). The filters 404 also receive a control signal which determines if they are operating in the edge-enhancing mode or the edge-preservation mode. The control signal may be provided by an encoder and may be set per a user's instructions. Each of the filters 404 receives five pixel values, e.g., pixel values from the two adjacent pixels and values from two pixels separated by one pixel, and four associated $K_X$ values. The fifth $K_X$ value may be associated with the center pixel of the filter, the pixel being filtered, and may be a 256, the maximum $K_X$ value in this implementation. The $K_X$ values may be generated by a GetK processor, such as the GetK 304 of FIG. 3, which may generate the $K_X$ values in accordance with Equation 1. Each of the filters 404 may generate a filtered pixel value. The spatial filter 400 may be used by an encoding system, such as encoder 100 of FIG. 1, twice to produce filtered output images that have been filtered both horizontally and vertically.

Figure 5:
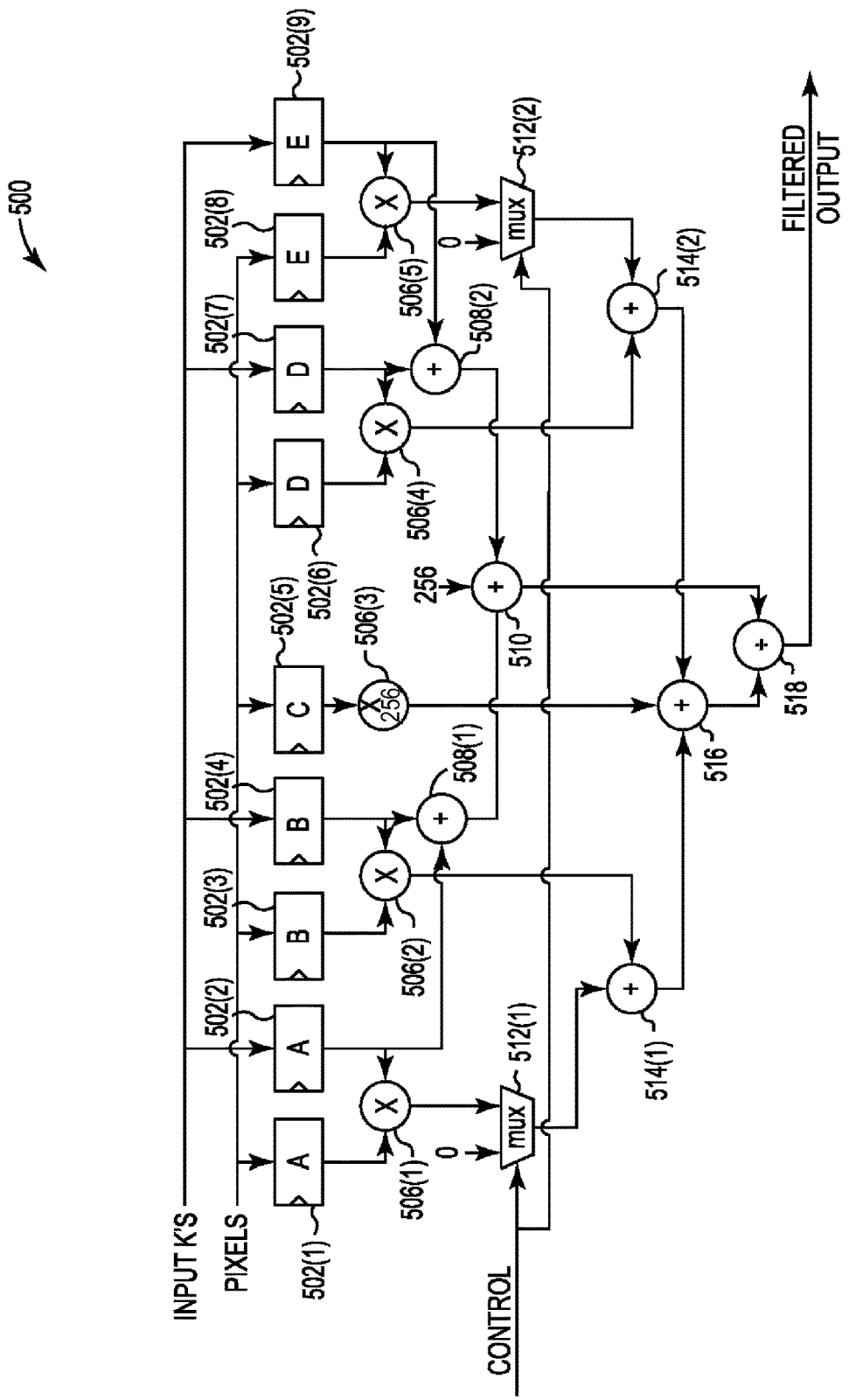
FIG. 5 is another illustrative example of a spatial noise filter according to the present disclosure.

FIG. 5 is another illustrative example of a spatial noise filter 500 according to the present disclosure. The spatial noise filter 500 may be used as one of the filters 404 of FIG. 4, for example. The spatial noise filter 500 is depicted to implement a five-tap filter using four $K_X$ coefficients and a fifth implied $K_X$ coefficient of 256. As above, the weighting factor of 256 is used with the center pixel, the pixel being filtered. The spatial filter 500 includes nine registers—registers 502(1)-502(9)—but these registers may be omitted and are only shown for ease of explanation. The spatial filter 500 depicts a structural block diagram of an implementation of Equation 1 using registers as shown.

The registers are configured to receive $K_X$ values and pixel values for filtering one center pixel. The $K_X$ values will be associated with the four pixels surrounding the center pixel and may be used in performing the filtering operation on the center pixel. The flow of information and the calculation blocks may be configured to implement Equation 1 provided above, or other equations in other examples, which may provide a filtered pixel value. The mode of the spatial filter 500 preservation or enhancement may be controlled by the two multiplexers (MUX) 512(1) and 512(2), which may receive the control signal.

To illustrate, a set of five input pixels, labeled A, B, C, D, and E, where C represents the center pixel and the pixel, to be filtered, may be received by the spatial filter 500. Additionally, corresponding $K_X$ values may also be received, the $K_X$ values labeled $K_A$, $K_B$, $K_D$, and $K_E$. As discussed above, the $K_X$ values may be weighting factors based in part on the pixel value difference between a pixel in the filter and the center pixel value. The $K_X$ values may also depend on configuration parameters MD, 2*MD and ofs when in the edge preservation mode. In the edge enhancement mode, the configuration parameters MD1, 2*MD1 and ofs1 may also determine the value of the filtered pixel. The KX values depicted in FIG. 5 may have already been determined by a separate component, such as the GetK 304 of FIG. 3 for example.

The registers 502(1)-(9) may receive pixel values and $K_X$ values such that corresponding pairs of registers receive the pixel value and the associated $K_X$ value. As depicted in FIG. 5, the register 502(1) receives the value for pixel A and the register 502(2) receives the weighting factor for pixel A, the $K_A$ value. This same pattern may continue down the line of registers as noted by the register labels. As described above, the weighting factor $K_C$ for the center pixel is an implied 256, and so a register may not be required. Instead, the 256 value (or other center pixel value) may be hardwired into the spatial filter 500, by storing the center pixel value in a register for example. To calculate the numerator of Equation 1, the pixel values and their respective KX values may be multiplied together by the multipliers 506(1)-(5). The control signal may select to couple the outputs of the multipliers 506(1) and 506(5) to the output of the mux 512(1) and 512(2), respectively when in the edge preservation mode. The calculated products may then be provided to adders 514(1), 514(2) and 516 to produce the numerator of Equation 1. The denominator of Equation 1 may be calculated by 508(1), 508(2) and 510. The numerator may then be divided by the denominator b divider 518 to provide the final value for the filtered center pixel. The process may then be repeated for a subsequent set of five pixels.

In the edge enhancement mode the control may cause mux 512(1) and 512(2) to provide 0 to the adders 514(1) and 514(2), respectively. In combination with generating the appropriate K values for the edge enhancement mode may provide filtered pixels for enhancing edges.

Figure 6:
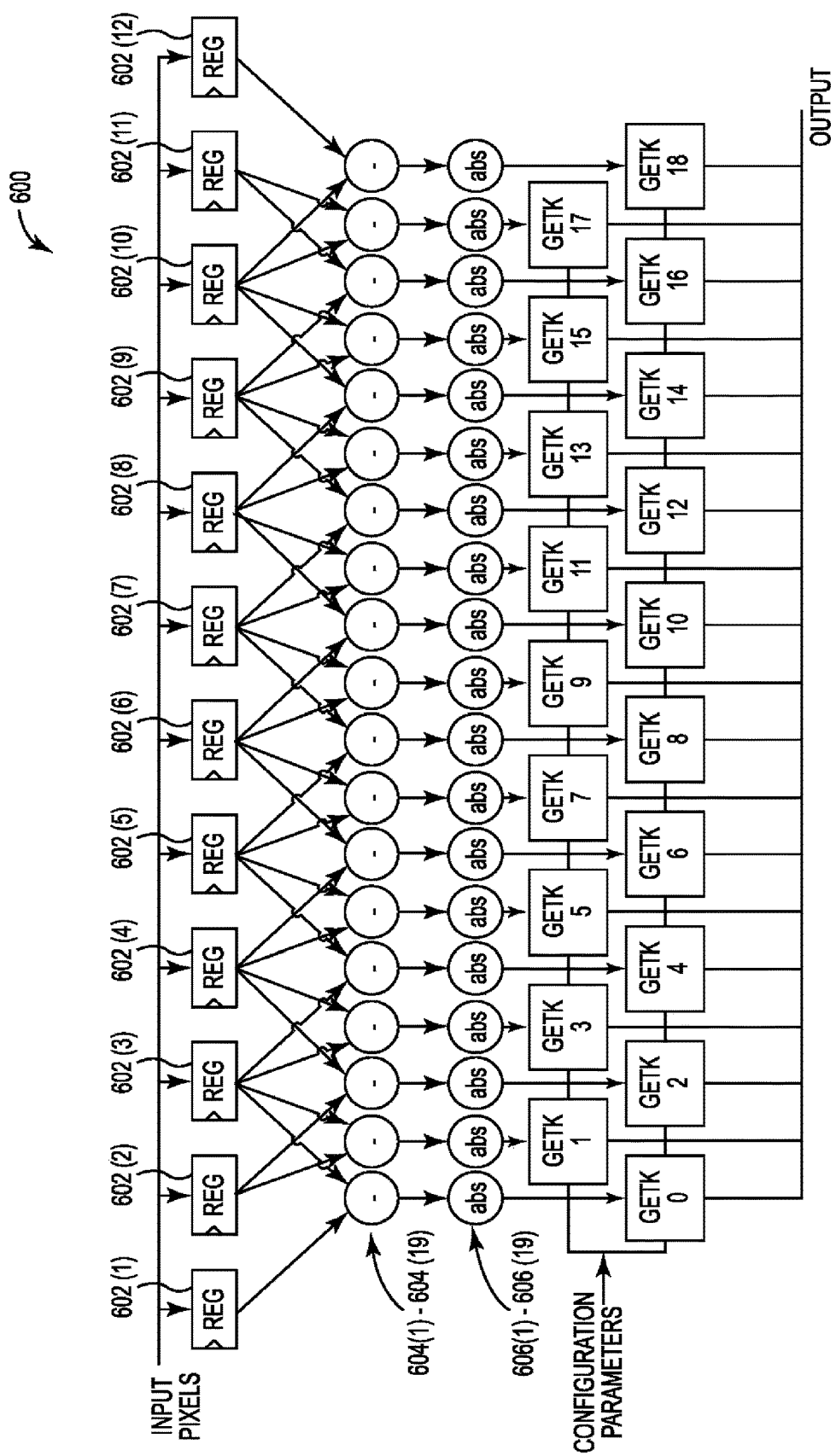
FIG. 6 is an illustrative example of a weighting factor processing module according to the present disclosure.

FIG. 6 is an illustrative example of a weighting factor processing module 600 according to the present disclosure. The weighting factor processing module 600, also referred to as the GetK 600, may perform parallel calculation of the weighting factors for 8 pixels and may be implemented in an edge-aware spatial filter, such as the spatial filter 206 of FIG. 2 or the spatial filter 300 of FIG. 3. The GetK 600 module may further be implemented as the GetK 304 of FIG. 3, for example. Although the GetK 600 is illustrating the calculation of weighting factors for 8 pixels, weighting factors for any number of pixels may be calculated. For each pair of input pixels that are adjacent a GetK calculation is performed. Also, for each pair of input pixels separated by one pixel, a GetK calculation is also performed. Thus, for 12 input pixels, which is the number of pixels needed for filtering 8 pixels in some examples, 19 GetK operations may be performed.

The registers 602(1)-602(12) may receive a sequence of 12 pixel values and the registers may store them such that the adjacent values represent adjacent pixels from an input image. The pixel values may then be distributed to various subtraction units 604(1)-604(19) as shown by the arrows. The values resulting from the subtraction operations may then be provided to the absolute blocks 606(1)-606(19), which generate the absolute values of the subtraction operations. The result of the absolute operations may then be provided, to the GetK0-GetK18 blocks. The GetK0-18 blocks may also receive the configuration parameters, which may be based on the noise level and which mode of a spatial filter. Based on the configuration parameters, the GetK0-18 blocks may then generate the weighting factors for the input pixels.

Figure 7:
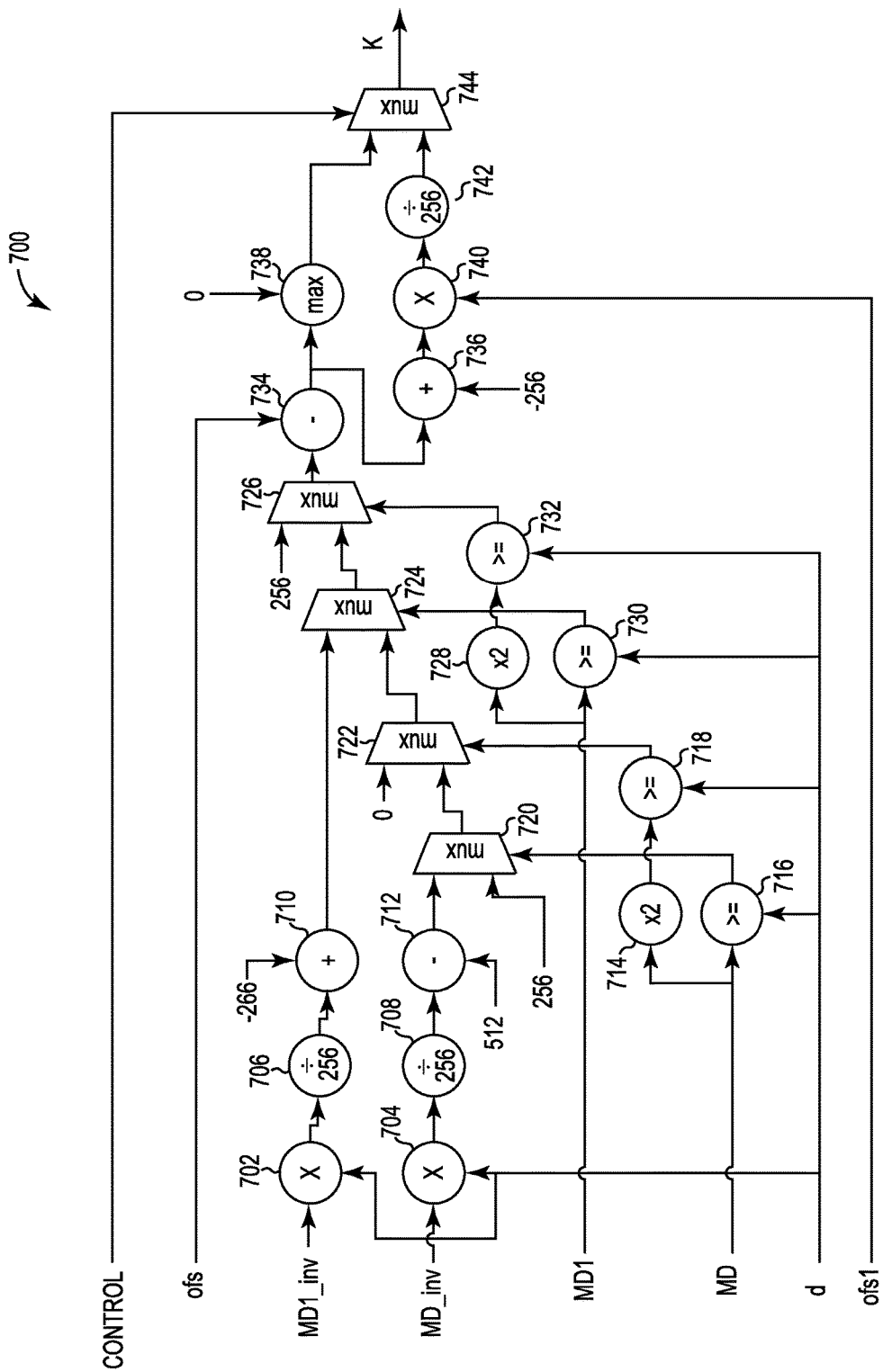
FIG. 7 is another illustrative example of a weighting factor processing module according to the present disclosure.

FIG. 7 is illustrative example of a GetK 700 according, to the present disclosure. The GetK 700 may generate a weighting factor $K_X$ for an absolute difference in pixel value for two adjacent pixels or for two pixels that are separated by a single pixel and may be used as one of the GetK0-18 of FIG. 6, fir example. The GetK 700 may receive numerous inputs, such as the mode control signal, and all of the configuration parameters that are associated with both modes. The configuration parameters are MD, the inverse of MD, ofs, MD1, the inverse of MD1, and ofs1. The inverse of MD1 and MD2 may be generated by an inverter (not shown), such as the inverter 302 of FIG. 3, for example. The d input is the absolute difference value obtained after subtracting two pixel values and may be provided by, for example, an absolute 606 as illustrated in FIG. 6.

The combination of operators 704, 708, and 712 may calculate the linear interpolation of a $delta_x$ for the edge-preservation mode. The calculation may be performed even though the specific $delta_x$ is not between MD and 2*MD. If the $delta_x$ is not between the two thresholds, then later operators of the GetK 700 may not use the output of this combination of operators. The linear interpolation calculation may be performed at this stage for ease of implementation and may propagate through the GetK 700 is the $delta_x$ is between the two thresholds. In parallel, the GetK 700 may make several decisions regarding the relation between d (e.g., $delta_x$) and the various thresholds related to both operational modes—MD, 2*MD, MD1, and 2*MD1, These decisions determine where the d falls with respect to those thresholds, which in turn determines the value of the output $K_X$. In parallel, d is compared to MD at operator 716, to 2*MD at operator 718, to MD1 at operator 730, and to 2*MD1 at operator 732. The outputs of the decision operators may determine an output of a corresponding multiplexer (MUX), such as the MUX 720, 722, 724, and 726. For example, if it is determined at operator 716 that d is less than MD, the output of MD may cause the MUX 720 to provide the value of 256 as its output. Further, the value of d, based on the decisions at operators 718, 730 and 732, may cause the value of 256 to propagate through the MUXs 722, 724, and 726 to be provided to the subtraction operator 734.

However, if d is greater than MD but less than 2*MD, then the decision operator 716 may cause the MUX 720 to couple the output of the combination of operators 704, 708, and 712 (e.g., the linear interpolation calculation for edge preservation mode) to the output of the MUX 720. The decision 718 may then couple the output of the MUX 720 to its output. This linear interpolation value may then continue to propagate through the MUXs 724 and 726 to the subtraction operator 734. If d is greater than 2*MD, then the decision operators may cause the MUX 722 to couple the value of zero to its output and to propagate zero through to the subtraction operator 734.

Additionally, regardless of what mode the GetK 700 is in, the same d may cause the output of the combination of operators 702, 706 and 710 to be propagated through to the subtraction operator 734. The output of the operators 702, 706, and 710 may be the KX value based on the linear interpolation for when $delta_x$ is between the two thresholds of the edge enhancement mode. This may occur if the decision operators determine that d is greater than MD1 but less than 2*MD1. Lastly, if d is greater than or equal to 2*MD1, then the MUX 726 provides the value of 256 to the subtraction operator 734.

At the subtraction operator 734, the value of ofs, if there is one, may be subtracted from the $K_X$ value that has been provided by the MLA 726 and the subtraction may be performed regardless of the operational mode of the GetK 700 even though ofs is associated with the edge preservation mode. The decision operator 738 then determines if the maximum value between the output of the subtraction operator 734 and zero. It the subtraction, of ofs from the output of the MUX 726 is a negative number, then the decision operator 738 provides a value of zero to the MUX 744. The output of the decision operator 738 may be the $K_X$ value when the GetK 700 is in the edge preservation mode.

In parallel with the decision operator 738, the output of the subtraction operator 734 may go through the operators 736, 740 and 742, which may provide a $K_X$ value if the GetK 700 is in the edge enhancement mode. In the edge enhancement mode, the ofs configuration parameter may be set to zero, which would imply the output of the subtraction operator 734 is not altered by the subtraction. Thus, the KX value provided by the MUX 726 may then be reduced by 256 at the adder operator 736. The output of the adder operator 736 may then be multiplied by the configuration parameter ofs1. The product of the multiplier operator 740 may then be divided by 256. The final output of the divide operator 742 may be the KX value if the filter implementing the GetK 700 is in the edge enhancement mode.

Lastly, the control signal may select the appropriate input to provide as an output of the MUX 744. The output of the MUX 744 would be the final $K_X$ value determined by the GetK 700. Thus, if the GetK 700 is in the edge enhancement mode, then the output of the divide operator 742 is provided as the output of the MUX 744. Conversely, if the GetK 700 is in the edge preservation mode, then the output of the max decision operator 738 is provided by the MLA 744.

Figure 8:
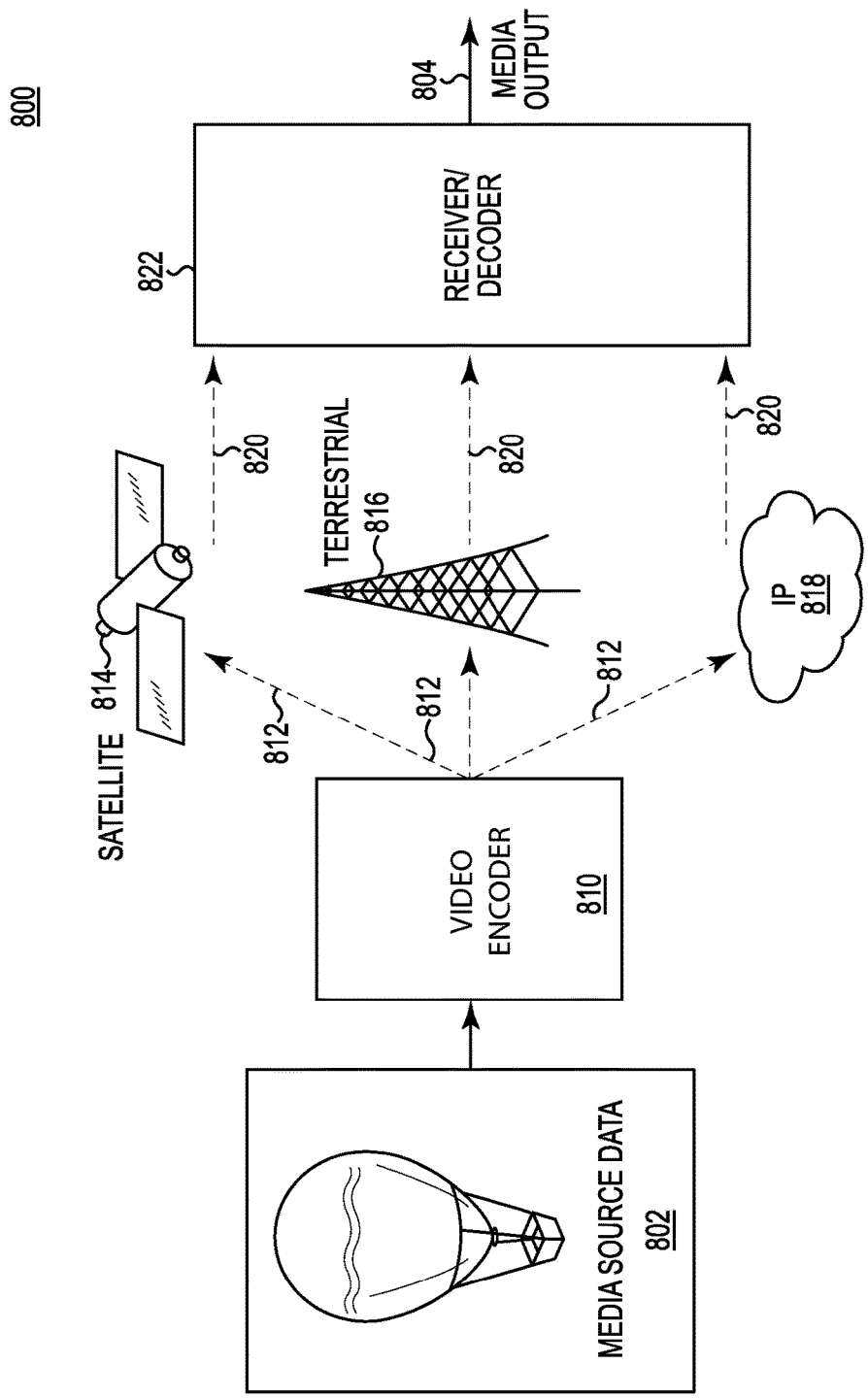
FIG. 8 is a schematic illustration of a media delivery system according to the present disclosure.

FIG. 8 is a schematic illustration of a media delivery system 800 in accordance with embodiments of the present invention. The media delivery system 800 may provide a mechanism for delivering a media source 802 to one or more of a variety of media output(s) 804. Although only one media source 802 and media output 804 are illustrated in FIG. 8, it is to be understood that any number may be used, and examples of the present invention may be used to broadcast and/or otherwise deliver media content to any number of media outputs.

The media source data 802 may be any source of media content, including but not limited to, video, audio, data, or combinations thereof. The media source data 802 may be, for example, audio and/or video data that may be captured using a camera, microphone, and/or other capturing devices, or may be generated or provided by a processing device. Media source data 802 may be analog and/or digital. When the media source data 802 is analog data, the media source data 802 may be converted to digital data using, for example, an analog-to-digital converter (ADC). Typically, to transmit the media source data 802, some mechanism for compression and/or encryption may be desirable. Accordingly, a video processing system 810 may be provided that may filter and/or encode the media source data 802 using any methodologies in the art, known now or in the future, including encoding methods in accordance with video standards such as, but not limited to H.264, HEVC, VC-1, VP8 or combinations of these or other encoding standards. The video encoding system 810 may be implemented with embodiments of the present invention described herein. For example, the video encoding system 810 may be implemented using the encoder 100 of FIG. 1.

The encoded data 812 may be provided to a communications link, such as a satellite 814, an antenna 816, and/or a network 818. The network 818 may be wired or wireless, and further may communicate using electrical and/or optical transmission. The antenna 816 may be a terrestrial antenna, and may, for example, receive and transmit conventional AM and FM signals, satellite signals, or other signals known in the art. The communications link may broadcast the encoded data 812, and in some examples may alter the encoded data 812 and broadcast the altered encoded data 812 (e.g. by re-encoding, adding to, or subtracting from the encoded data 812). The encoded data 820 provided from the communications link may be received by a receiver 822 that may include or be coupled to a decoder. The decoder may decode the encoded data 820 to provide one or more media outputs, with the media output 804 shown in FIG. 8. The receiver 822 may be included in or in communication with any number of devices, including but not limited to a modem, router, server, set-top box, laptop, desktop, computer, tablet, mobile phone, etc.

The media delivery system 800 of FIG. 8 and/or the video encoding system 810 may be utilized in a variety of segments of a content distribution industry.

Figure 9:
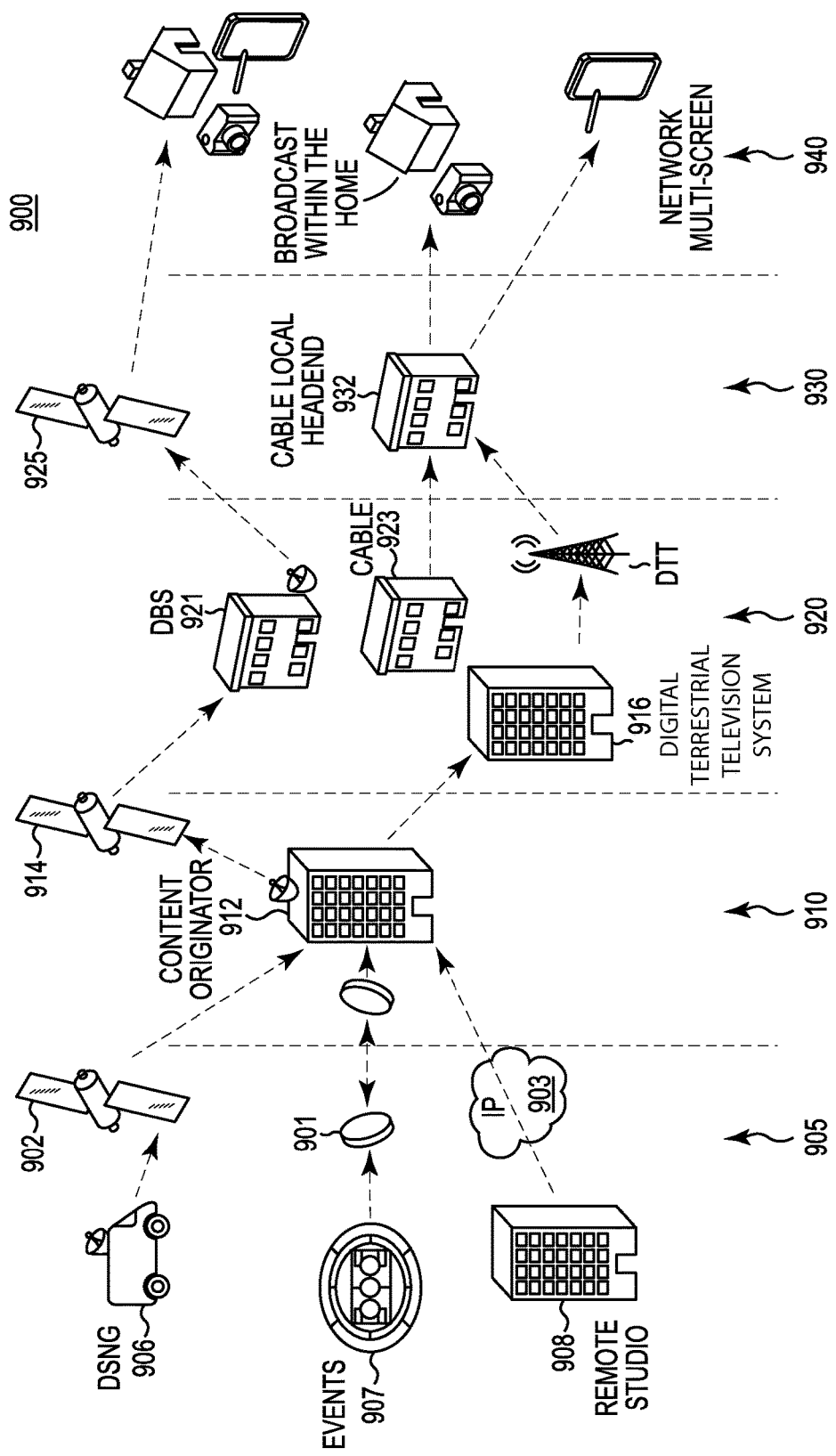
FIG. 9 is a schematic illustration of a video distribution system that may make use of video encoders described herein.

FIG. 9 is a schematic illustration of a video distribution system 900 that may make use of video encoding systems described herein. The video distribution system 900 includes video contributors 905. The video contributors 905 may include, but are not limited to, digital satellite news gathering systems 906, event broadcasts 907, and remote studios 908. Each or any of these video contributors 905 may utilize a video processing systems described herein, such as the encoder 100 of FIG. 1, to process media source data and provide processed data to a communications link. The digital satellite news gathering system 906 may provide encoded data to a satellite 902. The event broadcast 907 may provide encoded data to an antenna 901. The remote studio 908 may provide encoded data over a network 903.

A production segment 910 may include a content originator 912. The content originator 912 may receive encoded data from any or combinations of the video contributors 905. The content originator 912 may make the received content available, and may edit, combine, and/or manipulate any of the received content to make the content available. The content originator 912 may utilize video processing systems described herein, such as the encoder 100 of FIG. 1, to provide encoded data to the satellite 914 (or another communications link). The content originator 912 may provide encoded data to a digital terrestrial television system 916 over a network or other communication link. In some examples, the content originator 912 may utilize a decoder to decode the content received from the contributor(s) 905. The content originator 912 may then re-encode data and provide the encoded data to the satellite 914. In other examples, the content originator 912 may not decode the received data, and may utilize a transcoder to change a coding format of the received data.

A primary distribution segment 920 may include a digital broadcast system 921, the digital terrestrial television system 916, and/or a cable system 923. The digital broadcasting system 921 may include a receiver, such as the receiver 822 described with reference to FIG. 8, to receive encoded data from the satellite 914. The digital terrestrial television system 916 may include a receiver, such as the receiver 822 described with reference to FIG. 8, to receive encoded data from the content originator 912. The cable system 923 may host its own content which may or may not have been received from the production segment 910 and/or the contributor segment 905. For example, the cable system 923 may provide its own media source data 802 as that which was described with reference to FIG. 8.

The digital broadcast system 921 may include a video encoding system, such as the encoder 100 of FIG. 1, to provide encoded data to the satellite 925. The cable system 923 may include a video encoding system, such as the encoder 100 of FIG. 1, to provide encoded data over a network or other communications link to a cable local headend 932. A secondary distribution segment 930 may include, for example, the satellite 925 and/or the cable local headend 932.

The cable local headend 932 may include a video encoding system, such as the encoder 100 of FIG. 1, to provide encoded data to clients in a client segment 940 over a network or other communications link. The satellite 925 may broadcast signals to clients in the client segment 940. The client segment 940 may include any number of devices that may include receivers, such as the receiver 822 and associated decoder described with reference to FIG. 8, for decoding content, and ultimately, making content available to users. The client segment 940 may include devices such as set-top boxes, tablets, computers, servers, laptops, desktops, cell phones, etc.

Accordingly, filtering, encoding, and/or decoding may be utilized at any of a number of points in a video distribution system. Embodiments of the present invention may find use within any, or in some examples all, of these segments.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

What is claimed is:

1. A method for edge preserving, comprising the steps of:
generating a plurality of absolute pixel value differences between a target pixel and each pixel of a set of pixels surrounding the target pixel using a filter circuit;
comparing each of the absolute pixel value differences to a first threshold and second threshold, wherein the first threshold is different than the second threshold;
generating a plurality of weighting factors corresponding to the pixels in the set of pixels based on the comparisons, wherein the weighting factors are set to (i) a first value where a corresponding one of the absolute pixel value differences is less than a first threshold, (ii) a second value where the corresponding absolute pixel value difference is greater than a second threshold and (iii) a third value in a range of values between the first value and the second value where the corresponding absolute pixel value difference is between the first threshold and the second threshold;
generating a plurality of weighted pixels by multiplying the weighting factors by the pixels in the set of pixels;
generating a filtered pixel by filtering the target pixel based on the weighted pixels, wherein the filtering reduces random noise from frames while maintaining one or more edges in the frames; and
generating a bitstream by encoding the filtered pixel using an encoder circuit.

2. The method of claim 1, wherein each of the third values is generated by a linear interpolation between the first value and the second value based on a position of the corresponding weighting factor between the first threshold and the second threshold.

3. A method for edge preserving, comprising the steps of:
determining an absolute pixel value difference between a target pixel and an adjacent pixel using a filter circuit;
determining whether the absolute pixel value difference exceeds a first threshold;
responsive to determining that the absolute pixel value difference does not exceed the first threshold, assigning a weighting factor to a first value;
responsive to determining that the absolute pixel value difference exceeds the first threshold, determining whether the absolute pixel value difference exceeds a second threshold, wherein the first threshold is different than the second threshold;
responsive to determining that the absolute pixel value difference exceeds the second threshold, assigning the weighting factor to a second value;
responsive to determining that the absolute pixel value difference is between the first threshold and the second threshold, assigning the weighting factor to a third value in a range of values between the first value and the second value;
generating a weighted pixel by multiplying the weighting factor by the adjacent pixel;
generating a filtered pixel by filtering the target pixel based on the adjacent pixel, wherein the filtering reduces random noise from frames while maintaining one or more edges in the frames; and
presenting the filtered pixel in an output signal.

4. The method according to claim 3, wherein (i) the first value is a maximum possible value of the target pixel and (ii) the second value is zero value.

5. The method according to claim 1, wherein the first value is a maximum possible value in the set of pixels.

6. The method according to claim 1, wherein the second value is a minimum possible value in the set of pixels.

7. The method according to claim 1, wherein the set of pixels comprises a consecutive set with the target pixel at a center of the consecutive set.

8. The method according to claim 1, further comprising the step of:
adjusting the second threshold to a size of a smallest edge to be preserved.

9. The method according to claim 1, further comprising the step of:
determining a noise level of an image containing the set of pixels.

10. The method according to claim 9, further comprising the step of:
adjusting the first threshold above the noise level.

11. An apparatus comprising:
a filter circuit configured to (i) generate a plurality of absolute pixel value differences between a target pixel and each pixel of a set of pixels surrounding the target pixel, (ii) compare each of the absolute pixel value differences to a first threshold and second threshold, wherein the first threshold is different than the second threshold, (iii) generating a plurality of weighting factors corresponding to the pixels in the set of pixels based on the comparisons, wherein the weighting factors are set to (a) a first value where a corresponding one of the absolute pixel value differences is less than a first threshold, (b) a second value where the corresponding absolute pixel value difference is greater than a second threshold and (c) a third value in a range of values between the first value and the second value where the corresponding absolute pixel value difference is between the first threshold and the second threshold, (iv) generate a plurality of weighted pixels by multiplying the weighting factors by the pixels in the set of pixels and (v) generate a filtered pixel by filtering the target pixel based on the weighted pixels, wherein the filtering reduces random noise from frames while maintaining one or more edges in the frames; and
an encoder circuit configured to generate a bitstream by encoding the filtered pixel.

12. The apparatus according to claim 11, wherein each of the third values is generated by a linear interpolation between the first value and the second value based on a position of the corresponding weighting factor between the first threshold and the second threshold.

13. The apparatus according to claim 11, wherein the first value is a maximum possible value in the set of pixels.

14. The apparatus according to claim 11, wherein the second value is a minimum possible value in the set of pixels.

15. The apparatus according to claim 11, wherein the set of pixels comprises a consecutive set with the target pixel at a center of the consecutive set.

16. The apparatus according to claim 11, wherein the filter circuit is further configured to adjust the second threshold to a size of a smallest edge to be preserved.

17. The apparatus according to claim 11, wherein the filter circuit is further configured to determine a noise level of an image containing the set of pixels.

18. The apparatus according to claim 17, wherein the filter circuit is further configured to adjust the first threshold above the noise level.

* * * * *